(12) United States Patent
Kim

(10) Patent No.: US 10,721,678 B2
(45) Date of Patent: *Jul. 21, 2020

(54) METHOD AND APPARATUS FOR RECEIVING OSI BLOCK IN A WIRELESS COMMUNICATION SYSTEM

(71) Applicant: LG Electronics Inc., Seoul (KR)

(72) Inventor: Sangwon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/429,652

(22) Filed: Jun. 3, 2019

(65) Prior Publication Data

US 2019/0289533 A1 Sep. 19, 2019

Related U.S. Application Data

(63) Continuation of application No. 16/064,634, filed as application No. PCT/KR2017/004674 on May 2, 2017.

(Continued)

(51) Int. Cl.
*H04W 48/12* (2009.01)
*H04L 27/26* (2006.01)
(Continued)

(52) U.S. Cl.
CPC ......... *H04W 48/14* (2013.01); *H04L 27/2613* (2013.01); *H04W 48/12* (2013.01); *H04W 48/16* (2013.01); *H04W 74/002* (2013.01)

(58) Field of Classification Search
CPC ..... H04W 48/14; H04W 48/12; H04W 48/16; H04W 74/002; H04L 27/2613
See application file for complete search history.

(56) References Cited

U.S. PATENT DOCUMENTS

2015/0195774 A1 7/2015 Lee et al.
2016/0128006 A1* 5/2016 Ji .................... H04W 48/14
370/350

(Continued)

FOREIGN PATENT DOCUMENTS

KR  20110066972  6/2011
KR  1101457  1/2012
(Continued)

OTHER PUBLICATIONS

United States Office Action in U.S. Appl. No. 16/064,634, dated Jun. 28, 2019, 11 pages.

*Primary Examiner* — Marisol Figueroa
(74) *Attorney, Agent, or Firm* — Fish & Richardson P.C.

(57) ABSTRACT

Provided are a method for receiving an on-demand system information (OSI) block by a terminal in a wireless communication system and an apparatus for supporting the same. The method may comprise the steps of: receiving, from a network, an on-demand system information (OSI) configuration including information on mapping between the OSI block and information on a system information request (SIR) preamble; determining an OSI block of interest; selecting an SIR preamble corresponding to the OSI block of interest on the basis of the OSI configuration; transmitting the selected SIR preamble to a serving cell so as to request the determined OSI block of interest; and receiving the requested OSI block of interest.

20 Claims, 9 Drawing Sheets

Related U.S. Application Data

(60) Provisional application No. 62/331,448, filed on May 4, 2016.

(51) Int. Cl.
*H04W 74/00* (2009.01)
*H04W 48/14* (2009.01)
*H04W 48/16* (2009.01)

(56) References Cited

U.S. PATENT DOCUMENTS

| | | | |
|---|---|---|---|
| 2016/0174135 A1* | 6/2016 | Yan | H04W 76/10 455/434 |
| 2016/0234759 A1 | 8/2016 | Kubota et al. | |
| 2017/0265165 A1 | 9/2017 | Li et al. | |
| 2018/0027546 A1 | 1/2018 | Martin et al. | |
| 2018/0310235 A1* | 10/2018 | You | H04W 8/00 |
| 2019/0037479 A1* | 1/2019 | Suzuki | H04W 48/14 |

FOREIGN PATENT DOCUMENTS

| | | |
|---|---|---|
| WO | WO2009082076 | 7/2009 |
| WO | WO2015154248 | 10/2015 |

* cited by examiner

METHOD AND APPARATUS FOR RECEIVING OSI BLOCK IN A WIRELESS COMMUNICATION SYSTEM

CROSS-REFERENCE TO RELATED APPLICATIONS

This application is a continuation of U.S. application Ser. No. 16/064,634, filed on Oct. 5, 2018, now allowed, which is a National Stage application under 35 U.S.C. § 371 of International Application No. PCT/KR2017/004674, filed on May 2, 2017, which claims the benefit of U.S. Provisional Application No. 62/331,448, filed on May 4, 2016. The disclosures of the prior applications are incorporated by reference in their entirety.

BACKGROUND OF THE INVENTION

Field of the Invention

The present invention relates to a wireless communication system, and more particularly, to a method for a user equipment (UE) to receive on-demand system information (OSI) block and an apparatus supporting the same.

Related Art

In order to meet the demand for wireless data traffic soaring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

In order to achieve the high data rates, 5G communication system may be implemented in very high frequency (mm-Wave) range (e.g., 60 gigabytes (60 GHz), such as a band) is being considered. In order to increase the path transfer distance loss mitigation and radio wave propagation in the very high frequency band, 5G communication system, beam forming (beamforming), giant array multiple-input multiple-output (massive MIMO), I-D multiple-input multiple-output (Full Dimensional MIMO: FD-MIMO), comprising: an array antenna (antenna array), an analog beam forming (analog beam-forming), and the large antenna (large scale antenna) techniques are discussed.

In addition to the network to improve the system, 5G communication system, the evolved small cells, improved small cell (advanced small cell), cloud radio access network (cloud radio access network: cloud RAN), high density network (ultra-dense network), device communications (device to device communication: D2D), wireless backhaul (wireless backhaul), mobile network (moving network), cooperative communication (cooperative communication), CoMP (Coordinated Multi-Points), and receiving an interference cancellation (interference cancellation) development of technologies such as this have been made.

In addition, 5G system, advanced coding and modulation (Advanced Coding Modulation: ACM) approach is FQAM (Hybrid FSK and QAM Modulation) and SWSC (Sliding Window Superposition Coding), and advanced access technologies FBMC (Filter Bank Multi Carrier), NOMA have been developed, such as (non orthogonal multiple access), and SCMA (sparse code multiple access).

System information refers to essential information for communication between a terminal and a base station. In 3GPP LTE, the system information is divided into an MIB (Master Information Block) and an SIB (System Information Block). The MIB is the most essential information. The SIB is subdivided into SIB-x forms according to its importance or cycle. The MIB is transmitted through a PBCH (Physical Broadcast Channel) which is a physical channel. The SIB is common control information and is transmitted through a PDCCH differently from the MIB.

SUMMARY OF THE INVENTION

Meanwhile, the number of system information blocks is continuously increasing, and radio resources are required to broadcast a system information block. Thus, as the number of system information blocks increases, the quantity of radio resources required to broadcast a system information block also inevitably increases. To transmit continuously increasing system information to a user equipment (UE), it is necessary to propose a method for acquiring system information that efficiently utilizes radio resources.

According to an embodiment, there is provided a method for receiving, by a UE, an on-demand system information (OSI) block in a wireless communication system. The method may include: receiving, from a network, an OSI configuration including information on mapping between information on a system information request (SIR) preamble and an OSI block; determining an OSI block of interest; selecting an SIR preamble corresponding to the OSI block of interest on the basis of the OSI configuration; requesting the determined OSI block of interest by transmitting the selected SIR preamble to a serving cell; and receiving the requested OSI block of interest.

The information on the SIR preamble may be a pattern of the SIR preamble.

The information on the SIR preamble may be an identifier (ID) of the SIR preamble.

The information on the SIR preamble may be an index of the SIR preamble.

The information on the SIR preamble may be a resource for the SIR preamble.

Different SIR preambles may be mapped to different OSI blocks. One SIR preamble may be mapped to a plurality of OSI blocks.

When the UE is interested in receiving a particular OSI block, the particular OSI block is not broadcast by the serving cell of the UE, and the UE does not have the particular OSI block that is valid, the particular OSI block may be determined as the OSI block of interest.

The method may further include requesting the OSI block of interest again by transmitting the selected SIR preamble to the serving cell when the OSI block of interest is not received within an OSI window.

The method may further include considering that obtaining system information fails when the OSI block of interest is not received within an OSI window and the number of times the SIR preamble is transmitted to the serving cell reaches the maximum number of SIR preamble transmissions. The serving cell may be considered by the UE as a barred cell.

The OSI configuration may further include at least one of a set of resources for transmitting the SIR preamble, a power-ramping factor for transmitting the SIR preamble, or a maximum transmission value for the SIR preamble.

The selected SIR preamble may be transmitted to the serving cell only during an SIR occasion.

The selected SIR preamble may be transmitted to the serving cell only when the OSI block of interest is not broadcast.

The OSI configuration may be broadcast through a network slice instance (NSI).

According to another embodiment, there is provided a UE for receiving an OSI block in a wireless communication system. The UE may include: a memory; a transceiver; and a processor to connect the memory and the transceiver, wherein the processor may be configured to: control the transceiver to receive, from a network, an OSI configuration including information on mapping between information on an SIR preamble and an OSI block; determine an OSI block of interest; select an SIR preamble corresponding to the OSI block of interest on the basis of the OSI configuration; control the transceiver to request the determined OSI block of interest by transmitting the selected SIR preamble to a serving cell; and control the transceiver to receive the requested OSI block of interest.

A UE can selectively receive OSI of interest.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A/5G. However, technical features of the present invention are not limited thereto.

Figure 1:
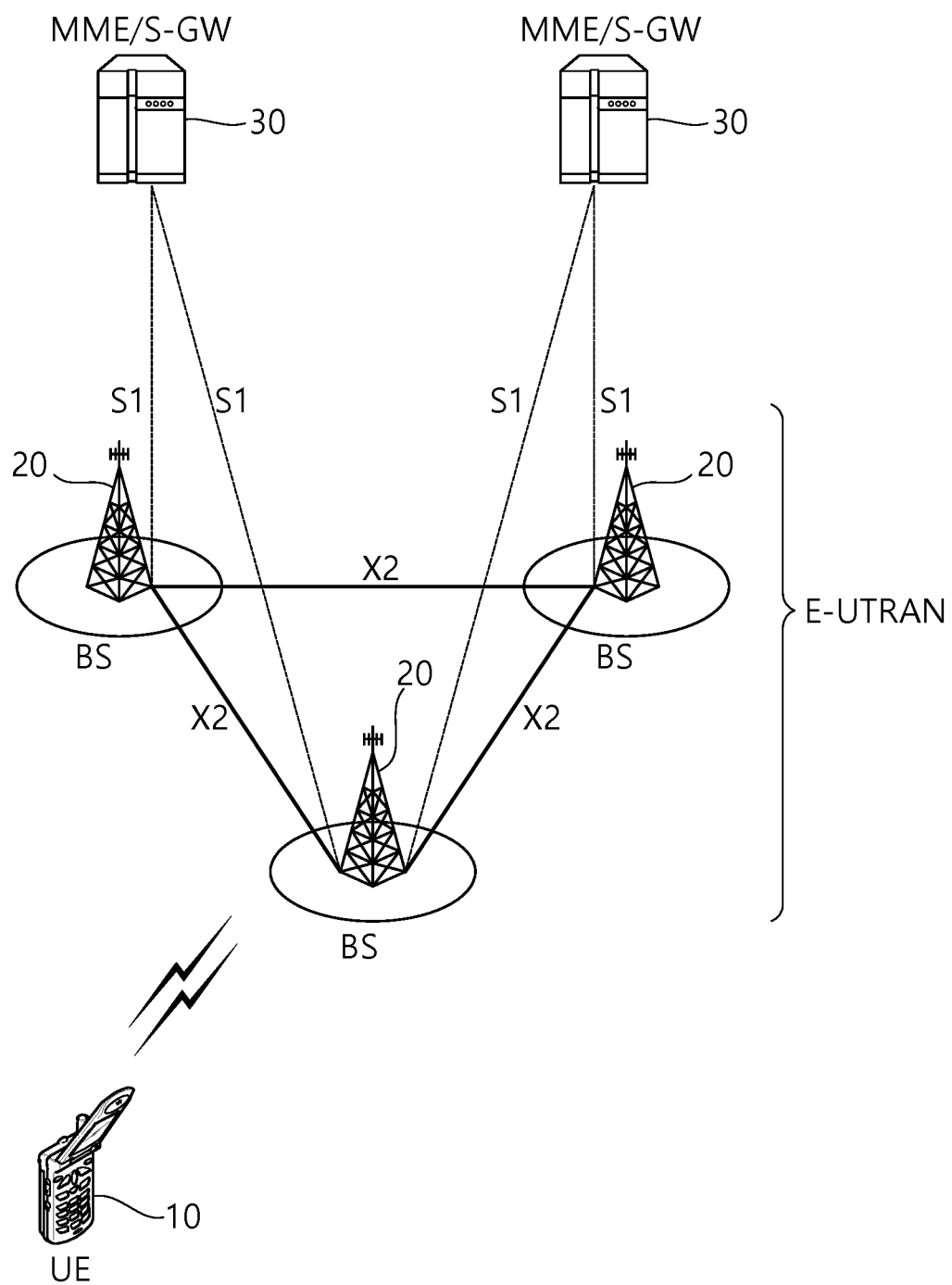
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
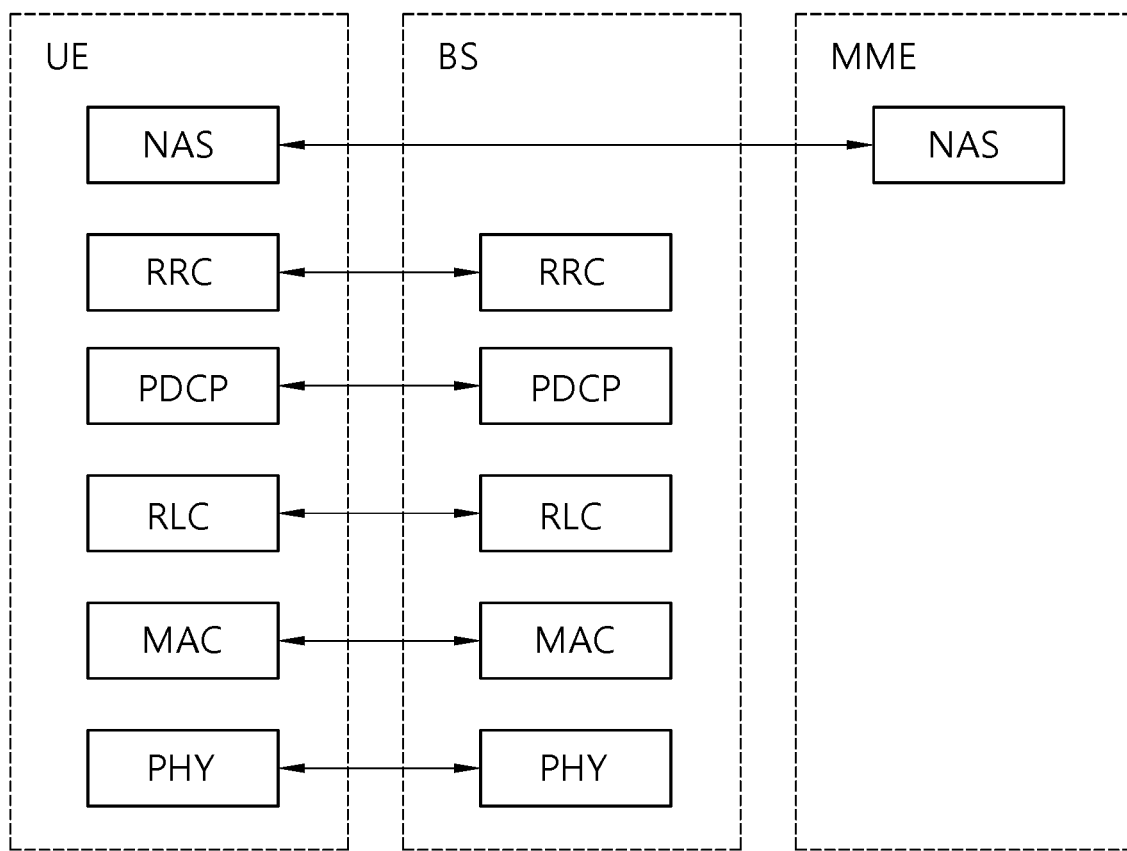
FIG. 2 shows a control plane of a radio interface protocol of an LTE system.
Figure 3:
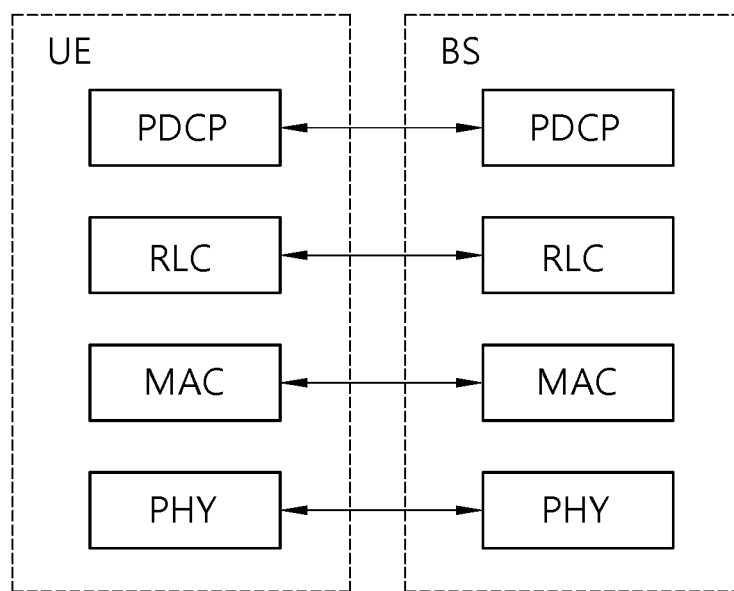
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, system information will be described.

Figure 4:
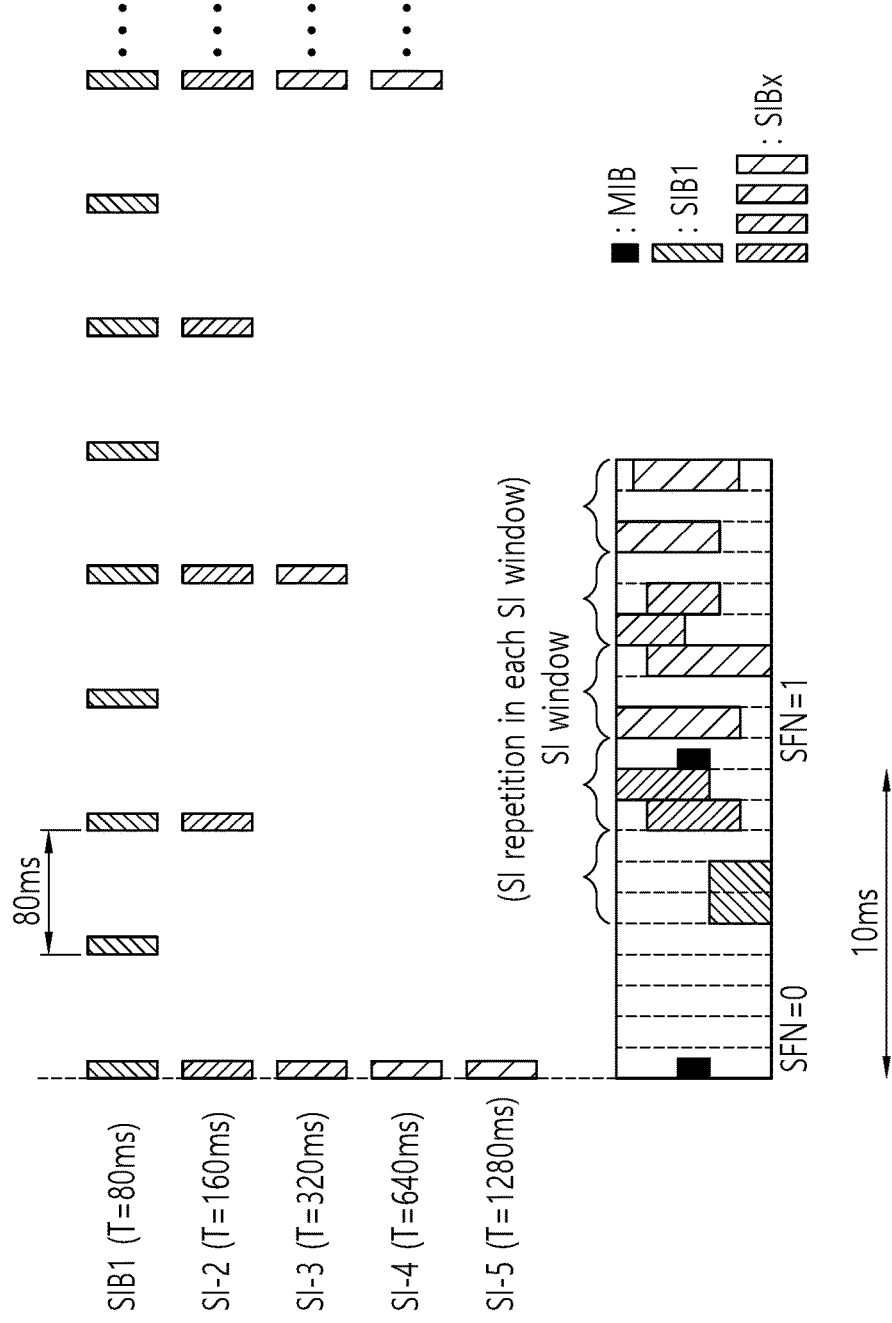
FIG. 4 shows an example of transmitting a master information block (MIB), system information block1 (SIB1), and other SIBs.

FIG. 4 shows an example of transmitting a master information block (MIB), system information block1 (SIB1), and other SIBs.

An LTE cell broadcasts basic parameters necessary for the operation of an IDLE_MODE UE and a CONNECTED_MODE UE via a plurality of separate information blocks. Examples of information blocks include an MIB, SIB1, SIB2, and other SIBs (SIBn).

The MIB includes the most essential parameters needed for a UE to access a cell. Referring to FIG. 4, an MIB message is broadcast through a BCH according to a periodicity of 40 ms, and MIB transmission is repeated in all radio frames within the periodicity of 40 ms. The UE receives an SIB message using the parameters received via the MIB.

There are different types of SIBs.

SIB1 includes pieces of information associated with cell access, and particularly includes scheduling information on other SIBs (SIB2 to SIBn) than SIB1. SIBs having the same transmission periodicity among the SIBs other than SIB1 are transferred via the same system information (SI) message. Thus, scheduling information includes a mapping relationship between each SIB and an SI message. An SI message is transmitted within an SI window in a time domain, and each SI message is associated with one SI window. Since SI windows for different pieces of SI do not overlap, only one SI message is transmitted within an SI window. Thus, scheduling information includes the duration of an SI window and an SI transmission periodicity. Time/frequency for transmitting an SI message is determined by dynamic scheduling by a BS. SIB1 is broadcast through a downlink shared channel (DL SCH) according to a periodicity of eight radio frames (that is, 80-ms periodicity), and SIB1 is repeatedly retransmitted on a fifth subframe of an SFN-mod-2 radio frame within the 80-ms periodicity.

SIB2 includes necessary information for a UE to access a cell. SIB2 includes information on an uplink cell bandwidth, a random access parameter, and an uplink power control parameter.

SIB3 includes cell reselection information. SIB4 includes frequency information on a serving cell and intra-frequency information on a neighboring cell for cell reselection. SIB5 includes frequency information on a different E-UTRA and inter-frequency information on a neighboring cell for cell reselection. SIB6 includes frequency information on a UTRA and information on a UTRA neighboring cell for cell reselection. SIB7 includes frequency information on a GERAN for cell reselection. SIB8 includes information on a neighboring cell.

SIB9 includes a Home eNodeB (HeNB) identifier (ID). SIB10 to SIB12 include a public warning message, for example, for earthquake warning. SIB14 is used to support enhanced access barring and controls UEs to access a cell. SIB15 includes information needed to receive an MBMS at contiguous carrier frequencies. SIB16 include GPS time and coordinated universal time (UTC)-related information. SIB17 includes RAN auxiliary information.

Not all SIBs are always required to be present. For example, SIB9 is not needed in a mode where a wireless carrier establishes an HeNB, while SIB13 is not needed if a cell provides no MBMS.

System information is commonly applied to all UEs accessing a cell, and UEs need to always maintain up-to-date system information to perform an appropriate operation. When system information is changed, UEs need to know in advance the time the BS transmits new system information. In order that a BS and a UE mutually recognize a radio frame period for transmitting new system information, the concept of BCCH modification period is introduced in "3GPP TS 36.331 v9. 3.0," which is described in detail.

Figure 5:
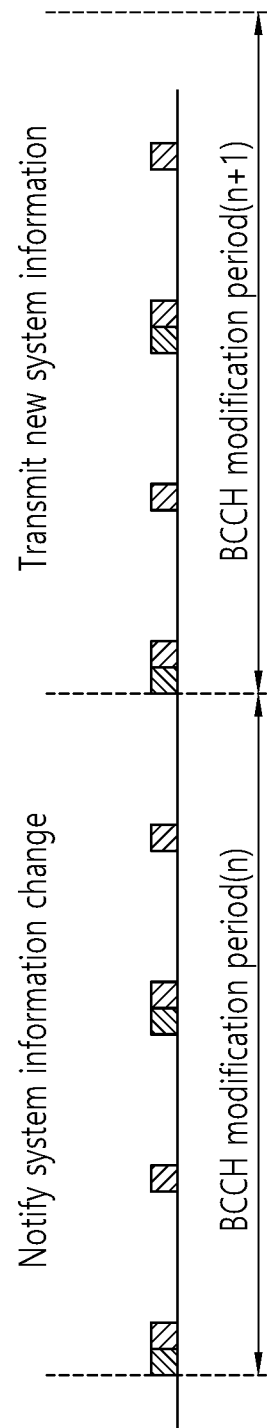
FIG. 5 shows an update of system information.

FIG. 5 shows an update of system information.

Referring to FIG. 5, a BS, which intends to update system information in an (n+1)th modification period, notifies in advance UEs of an update of system information in an nth modification period. A UE, which is notified the update of the system information in the nth modification period, receives and applies new system information at the very beginning of the (n+1)th modification period. When an update of system information is scheduled, the BS includes a system information modification indicator in a paging message. Generally, a paging message is a message received by an idle-mode UE. However, since an update of system information is notified through a paging message, a connected-mode UE also needs to receive a paging message at times and to identify an update of system information.

Hereinafter, random access will be described.

Random access is used by a UE to obtain uplink synchronization with a BS or to be allocated an uplink radio resource. After power is turned on, a UE obtains downlink synchronization with an initial cell and receives system information. Then, the UE acquires, from the system information, a set of available random access preambles and information about a radio resource used for transmission of a random access preamble. The radio resource used for transmission of the random access preamble may be specified as a radio frame and/or a combination of at least one or more subframes. The UE transmits a random access preamble randomly selected from the set of random access preambles, and the BS having received the random access preamble sends a timing alignment (TA) value for uplink synchronization to the UE through a random access response. Thus, the UE obtains uplink synchronization.

That is, the BS allocates a dedicated random access preamble to a specific UE, and the UE performs non-contention random access using the random access preamble. That is, there may be in a process of selecting a random access preamble, contention-based random access in which a UE randomly selects and uses one random access preamble from a particular set and non-contention random access in which only a specific UE is allocated a random access preamble by a BS. Non-contention random access may be used for a handover procedure or upon a request by a BS's command.

Figure 6:
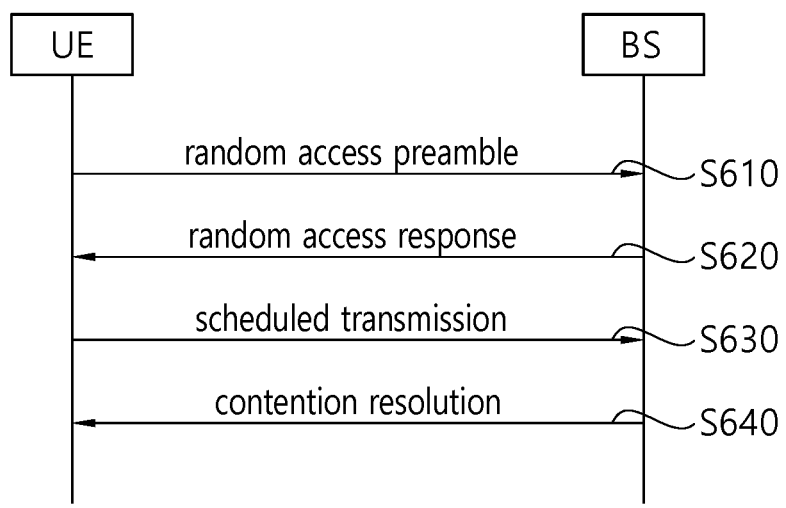
FIG. 6 illustrates a contention-based random access procedure.

FIG. 6 illustrates a contention-based random access procedure.

Referring to FIG. 6, a UE randomly selects one random access preamble from a random access preamble set indicated by system information or a handover command. The UE selects a radio resource for transmitting the random access preamble to transmit the selected random access preamble (S610). The radio resource may be a specific subframe, and selecting the radio resource may be selecting a physical random access channel (PRACH).

After transmitting the random access preamble, the UE attempts to receive a random access response within a random access response reception window indicated by the system information or the handover command and accordingly receives a random access response (S620). The random access response may be transmitted in an MAC PDU format, and the MAC PDU may be forwarded via a physical downlink shared channel (PDSCH). Further, a physical downlink control channel (PDCCH) is also forwarded so that the UE properly receives information forwarded via the PDSCH. That is, the PDCCH includes information on the UE receiving the PDSCH, frequency and time information on a radio resource for the PDSCH, and a transmission format for the PDSCH. Once successfully receiving the PDCCH forwarded to the UE, the UE properly receives the random access response transmitted via the PDSCH on the basis of the information in the PDCCH.

The random access response may include a random access preamble identifier (ID), an uplink radio resource (UL grant), a temporary cell-radio network temporary identifier (C-RNTI), and a time alignment command (TAC). Since one random access response may include random access response information for one or more UEs, a random access preamble ID may be included to indicate a UE for which a UL grant, a temporary C-RNTI, and a TAC are valid. The random access preamble ID may be an ID of the random access preamble received by a BS. The TAC may be included as information for the UE to adjust uplink synchronization. The random access response may be indicated by a random access ID on the PDCCH, that is, a random access-radio network temporary identifier (RA-RNTI).

When the UE receives the random access response valid therefor, the UE processes information included in the random access response and performs scheduled transmission to the BS (S630). That is, the UE applies the TAC and stores the temporary C-RNTI. Further, the UE transmits data stored in a buffer of the UE or newly generated data to the BS using the UL grant. In this case, information to identify the UE needs to be included, which is for identifying the UE in order to avoid a collision since the BS does not determine which UEs perform random access in a contention-based random access process.

There are two methods for including information for identifying a UE. When the UE has a valid cell ID already allocated by a corresponding cell before performing random access, the UE transmits the cell ID thereof through the UL grant. However, when the UE is not allocated a valid cell ID before the random access process, the UE transmits a unique ID thereof (e.g, S-TMSI or random ID). Generally, the unique ID is longer than the cell ID. When the UE transmits the data via the UL grant, the UE starts a contention resolution timer.

After transmitting the data including the ID of the UE through the UL grant allocated by receiving the random access response, the UE waits for an instruction from the BS to avoid a collision (S640). That is, the UE attempts to receive the PDCCH in order to receive a specific message. There are two proposed methods for receiving a PDCCH. As described above, when the ID of the UE transmitted via the UL grant is a cell ID, the UE may attempt to receive the PDCCH using the cell ID of the UE. In this case, when the UE receives the PDCCH through the cell ID of the UE before the contention resolution timer expires, the UE determines that random access has been normally performed and terminates random access. When the ID transmitted via the UL grant is the unique ID, the UE may attempt to receive the PDCCH using the temporary C-RNTI included in the random access response. In this case, when the UE receives the PDCCH through the temporary cell ID before the contention resolution timer expires, the UE identifies data forwarded by the PDSCH indicated by the PDCCH. When the data includes the unique ID of the UE, the UE may determine that random access has been normally performed and may terminate random access.

Figure 7:
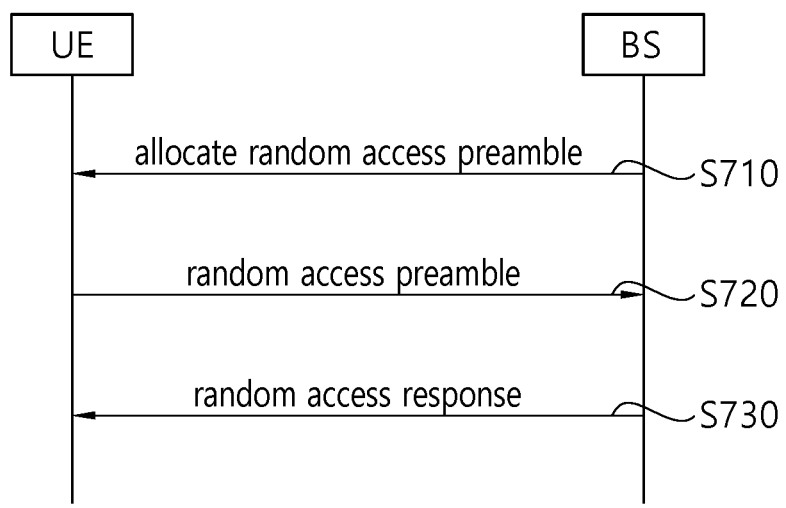
FIG. 7 illustrates a non-contention random access procedure.

FIG. 7 illustrates a non-contention random access procedure.

Unlike contention-based random access, non-contention random access may be terminated when a UE receives a random access response.

Non-contention random access may be initiated by a request, such as a handover and/or a command from a BS. Here, in these two cases, contention-based random access may also be performed.

The UE is allocated by the BS a designated random access preamble having no possibility of a collision. The random access preamble may be allocated through a handover command and a PDCCH command (S710).

After being allocated the random access preamble designated for the UE, the UE transmits the random access preamble to the BS (S720).

Upon receiving the random access preamble, the BS transmits a random access response to the UE in response (S730). A procedure associated with the random access response has been mentioned above in S620 of FIG. 6.

Hereinafter, a method for contention resolution in random access will be described.

The reason why contention occurs in performing random access is basically because the number of random access preambles is finite. That is, since a BS cannot assign a UE-specific random access preamble to all UEs, a UE randomly selects and transmits one of common random access preambles. Accordingly, when two or more UEs select and transmit the same random access preamble through the same radio resource (PRACH resource), the BS determines the random access preamble as one random access preamble transmitted from one UE. As a result, it is expected that the BS transmits a random access response to the UE and that the random access response is received by one UE. However, since contention may occur as described above, the two or more UEs receive one access response, and each UE performs an operation in response to the receipt of the random access response. That is, the two or more UEs transmit different data via the same radio resource using one UL Grant included in the random access response. Accordingly, all of such data transmission may fail or the BS may receive only data from a particular UE depending on the location or transmission power of the UEs. In the latter case, since all of the two or more UEs assume that data thereof have been successfully transmitted, the BS needs to report information on the failure of contention to UEs that have failed in contention. That is, reporting the information on the failure or success of the contention is referred to as contention resolution.

There are two contention resolution methods, which includes one method using a contention resolution timer (hereinafter, referred to as a CR timer) and the other method of transmitting an identifier of a successful UE to UEs. The former method is used when a UE already has a unique cell identifier (C-RNTI) before a random access procedure. That is, a UE already having a cell identifier transmits data including a cell identifier thereof to a BS in response to a random access response and operates a CR timer. When PDCCH information including the cell identifier of the UE is received before the CR timer expires, the UE determines that the UE is successful in contention and normally terminates random access. However, when a PDCCH including the cell identifier of the UE is not received before the CR timer expires, the UE determines that the UE has failed in contention and may perform the random access procedure again or may notify a higher layer of the failure. The latter contention resolution method, that is, the method of transmitting the identifier of the successful UE, is used when a UE has no unique cell identifier before a random access procedure. That is, when a UE does not have a cell identifier thereof, the UE transmits data including a higher identifier (S-TMSI or random ID) than a cell identifier according to UL grant information included in a random access response and operates a CR timer. When the data including the higher identifier of the UE is transmitted via a DL-SCH before the CR timer expires, the UE determines that the random access procedure is successful. However, when the data including the higher identifier of the UE is not transmitted via the DL-SCH before the CR timer expires, the UE determines that the random access procedure has failed.

The number of system information blocks is continuously increasing, and radio resources are required to broadcast a system information block. Thus, as the number of system information blocks increases, the quantity of radio resources required to broadcast a system information block also inevitably increases. To transmit continuously increasing system information to a UE, it is necessary to propose a method for efficiently utilizing radio resources. Hereinafter, a method for receiving an on-demand system information (OSI) block and a device supporting the same will be described according to an embodiment of the present invention.

According to an embodiment of the present invention, system information may be divided into two types of system information. One of the two types of system information may be normal system information (NSI) and the other may be on-demand system information (OSI).

The NSI may be a type of system information that is always broadcast. The NSI may also be referred to as minimum system information (MSI). For example, the NSI may include system information included in an MIB. Alternatively, the NSI may include system information included in an MIB and SIB1.

The OSI may be a type of system information that is broadcasted only when a UE requests the transmission of system information. Alternatively, the OSI may be a type of system information that is transmitted to a UE through dedicated signaling only when the UE requests the transmission of system information.

(1) Step 1: A UE may receive an OSI configuration from a network. The OSI configuration may be broadcast through a network slice instance (NSI).

The OSI configuration may include a mapping relationship between information on a system information request (SIR) preamble and an OSI block. The information on the SIR preamble may include at least one of a pattern of the SIR preamble, an ID of the SIR preamble, an index of the SIR preamble, or a resource for the SIR preamble. In the present specification, the SIR preamble may be a preamble used to request OSI.

Preferably, different OSI blocks may be mapped to different SIR preambles. For example, the OSI configuration may indicate that OSI block 1 is mapped to SIR preamble A and OSI block 2 is mapped to SIR preamble B. Alternatively, one SIR preamble may be mapped to a plurality of OSI blocks. For example, the OSI configuration may indicate that SIR preamble A is mapped to OSI block 1 and OSI block 2.

Preferably, an SIR preamble and a random access (RA) preamble may use different preamble resources.

Further, the OSI configuration may include a set of resources for SIR preamble transmission.

Further, the OSI configuration may include a power-ramping factor for SIR preamble transmission.

Further, the OSI configuration may include an initial preamble power for SIR preamble transmission. Preferably, when the power-ramping factor and/or initial preamble power for SIR preamble transmission are not provided, the UE may use a power-ramping factor and/or initial preamble power for transmitting an RA preamble in order to determine transmission power for an SIR preamble.

Further, the OSI configuration may include the maximum number of SIR preamble transmissions. That is, the OSI configuration may include the maximum number of transmission times an SIR preamble is allowed to be transmitted.

Preferably, an SIR occasion configuration may be defined. When an SIR occasion is configured, the UE may transmit an SIR preamble to a serving cell only during the SIR occasion.

(2) Step 2: The UE may determine OSI of interest.

The UE may consider an OSI block as part of the OSI of interest when the following conditions are satisfied.

Condition 1: The UE is interested in receiving an OSI block via broadcast signaling or dedicated signaling.
Condition 2: The OSI block is not being broadcast by the serving cell.
Condition 3: The UE does not have a valid OSI block.

(3) Step 3: The UE may transmit an SIR preamble corresponding to the OSI of interest to the serving cell. Preferably, the UE may transmit the SIR preamble corresponding to the OSI of interest only when the OSI of interest is not broadcast. The SIR preamble may be transmitted via a new physical channel. For example, the new physical channel may be an SIR preamble-specific physical channel. Alternatively, the SIR preamble may be transmitted via a physical random access channel (PRACH).

The UE may select an SIR preamble based on the received OSI configuration. When the UE is in an RRC-idle state, the UE may not initiate an RRC connection establishment procedure for acquiring OSI.

The UE may set preamble received target power (PRTP) according to the OSI configuration. The PRTP may be a target received power for a BS to receive the SIR preamble. An MAC layer may instruct the physical layer to transmit the SIR preamble, a corresponding OSI-RNTI, an SIR preamble index, and the PRTP.

When the SIR preamble is transmitted, the UE may monitor a PDCCH of the serving cell using the OSI-RNTI to check whether the system information of interest is transmitted.

(4) Step 4: The UE may receive the OSI of interest from the serving cell.

When the UE does not receive the system information of interest within an OSI window, the UE may retransmit the SIR preamble.

When the UE does not receive the system information of interest within the OSI window and the number of SIR preamble transmissions reaches the maximum number of SIR preamble transmissions, the UE may declare the failure of obtaining the system information. In this case, the UE may consider that the state of the serving cell is 'barred'. That is, the UE may consider the serving cell as a barred cell. Alternatively, the UE may initiate an RRC connection establishment procedure to request OSI via dedicated signaling.

According to the procedure proposed in the present invention, a UE may transmit an SIR preamble corresponding to OSI of interest to a serving cell on the basis of an OSI configuration, thereby selectively receiving only the OSI of interest. Therefore, the UE may efficiently use radio resources for receiving system information.

Figure 8:
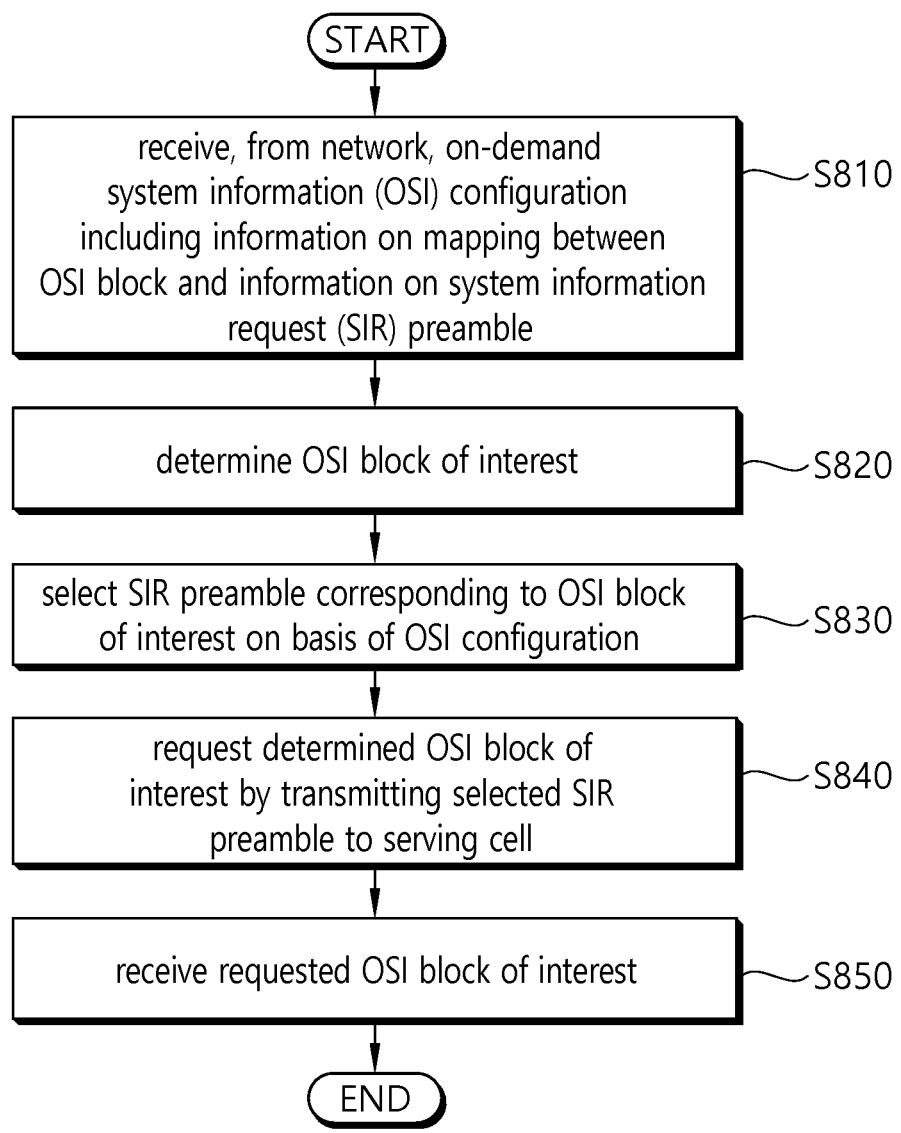
FIG. 8 is a block diagram illustrating a method for a UE to receive an on-demand system information (OSI) block according to an embodiment of the present invention.

FIG. 8 is a block diagram illustrating a method for a UE to receive an OSI block according to an embodiment of the present invention.

Referring to FIG. 8, in step S810, the UE may receive, from a network, an OSI configuration including information on mapping between information on an SIR preamble and an OSI block.

The information on the SIR preamble may be a pattern of the SIR preamble. The information on the SIR preamble may be an ID of the SIR preamble. The information on the SIR preamble may be an index of the SIR preamble. The information on the SIR preamble may be a resource for the SIR preamble.

Different SIR preambles may be mapped to different OSI blocks. Alternatively, one SIR preamble may be mapped to a plurality of OSI blocks.

The OSI configuration may further include at least one of a set of resources for transmitting the SIR preamble, a power-ramping factor for transmitting the SIR preamble, or a maximum transmission value for the SIR preamble.

The OSI configuration may be broadcast through a network slice instance (NSI).

In step S820, the UE may determine an OSI block of interest. When the UE is interested in receiving a particular OSI block, the particular OSI block is not broadcast by a serving cell of the UE, and the UE does not have the particular OSI block that is valid, the particular OSI block may be determined as the OSI block of interest.

In step S830, the UE may select an SIR preamble corresponding to the OSI block of interest on the basis of the OSI configuration.

In step S840, the UE may transmit the selected SIR preamble to the serving cell, thereby requesting the determined OSI block of interest. The selected SIR preamble may be transmitted to the serving cell only during an SIR occasion. The selected SIR preamble may be transmitted to the serving cell only when the OSI block of interest is not broadcast.

In step S850, the UE may receive the requested OSI block of interest.

When the OSI block of interest is not received within an OSI window, the UE may transmit the selected SIR preamble to the serving cell, thereby requesting the OSI block of interest again.

When the OSI block of interest is not received within the OSI window and the number of times the SIR preamble is transmitted to the serving cell reaches the maximum number of SIR preamble transmissions, the UE may consider that obtaining the system information has failed. In this case, the serving cell may be considered by the UE as a barred cell.

Figure 9:
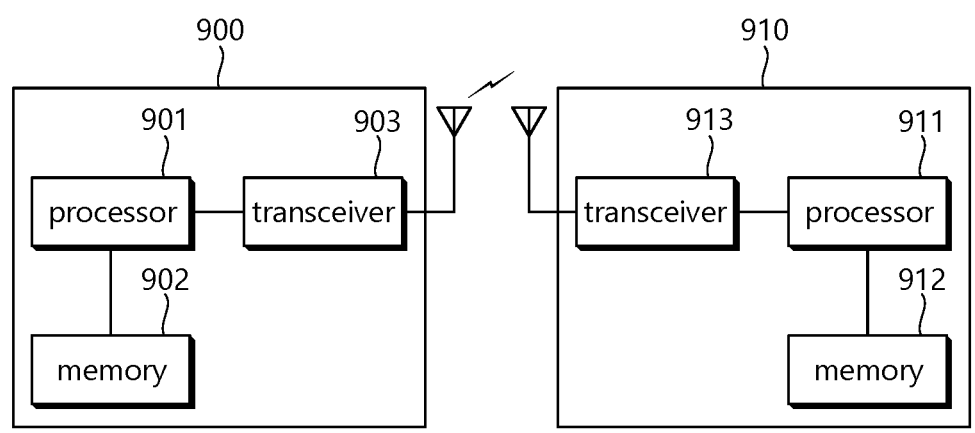
FIG. 9 is a block diagram illustrating a wireless communication system according to the embodiment of the present invention.

FIG. 9 is a block diagram illustrating a wireless communication system according to the embodiment of the present invention.

A BS 900 includes a processor 901, a memory 902 and a transceiver 903. The memory 902 is connected to the processor 901, and stores various information for driving the processor 901. The transceiver 903 is connected to the processor 901, and transmits and/or receives radio signals. The processor 901 implements proposed functions, processes and/or methods. In the above embodiment, an operation of the base station may be implemented by the processor 901.

A UE 910 includes a processor 911, a memory 912 and a transceiver 913. The memory 912 is connected to the processor 911, and stores various information for driving the processor 911. The transceiver 913 is connected to the processor 911, and transmits and/or receives radio signals. The processor 911 implements proposed functions, processes and/or methods. In the above embodiment, an operation of the UE may be implemented by the processor 911.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for receiving, by a user equipment (UE), first system information (SI) in a wireless communication system, the method comprising:
   receiving configuration for requesting the first SI, from a base station (BS);
   selecting a preamble for requesting the first SI based on the configuration, wherein the configuration informs the UE of an index of the preamble related to the first SI, and wherein the first SI is not being broadcast by the BS;
   based on the first SI not being broadcast by the BS, transmitting the preamble for requesting the first SI via a physical random access channel (PRACH), to the BS; and
   receiving the requested first SI from the BS.

2. The method of claim 1, wherein the preamble for requesting the first SI is transmitted to the BS, based on the first SI not being broadcast by the BS.

3. The method of claim 1, wherein the UE does not have valid version of a system information block (SIB) included in the first SI.

4. The method of claim 1, wherein the first SI is on-demand system information which is broadcast based on request from the UE.

5. The method of claim 1, wherein the configuration for requesting the first SI is included in second SI which is periodically broadcast.

6. The method of claim 1, wherein the selected preamble for requesting the first SI is transmitted within an occasion for requesting the first SI.

7. The method of claim 1, wherein the requested first SI is received within a SI-window.

8. The method of claim 1, wherein the preamble for requesting the first SI is related to one system information.

9. The method of claim 1, wherein the preamble for requesting the first SI is related to multiple system information.

10. The method of claim 1, wherein the first SI is system information of interest by the UE in the BS.

11. The method of claim 10, wherein the system information of interest is system information required by the UE in the BS.

12. The method of claim 1, further comprising:
    setting a preamble received target power (PRTP) for transmitting the selected preamble,
    wherein the PRTP is a target received power for the BS to receive the selected preamble.

13. The method of claim 12, wherein the selected preamble for requesting the first SI is transmitted based on the PRTP set by the UE.

14. A user equipment (UE) configured to receive first system information (SI) in a wireless communication system, the UE comprising:

a transceiver;

at least one processor; and at least one computer memory operably connectable to the at least one processor and storing instructions that, when executed by the at least one processor, perform operations comprising: controlling the transceiver to receive configuration for requesting the first SI, from a base station (BS);

selecting a preamble for requesting the first SI based on the configuration, wherein the configuration informs the UE of an index of the preamble related to the first SI, and wherein the first SI is not being broadcast by the BS;

based on the first SI not being broadcast by the BS, controlling the transceiver to transmit the preamble for requesting the first SI via a physical random access channel (PRACH), to the BS; and controlling the transceiver to receive the requested first SI from the BS.

15. The UE of claim 14, wherein the preamble for requesting the first SI is transmitted to the BS, based on the first SI not being broadcast by the BS.

16. The UE of claim 14, wherein the UE does not have valid version of a first system information block (SIB) included in the first SI.

17. The UE of claim 14, wherein the first SI is on-demand system information which is broadcast based on request from the UE.

18. The UE of claim 14, wherein the configuration for requesting the first SI is included in second SI which is periodically broadcast.

19. A processor for a wireless communication device, wherein the processor is configured to control the wireless communication device to perform operations comprising:

receiving configuration for requesting first system information (SI), from a base station (BS);

selecting a preamble for requesting the first SI based on the configuration, wherein the configuration informs the wireless communication device of an index of the preamble related to the first SI, and wherein the first SI is not being broadcast by the BS;

based on the first SI not being broadcast by the BS, transmitting the preamble for requesting the first SI via a physical random access channel (PRACH), to the BS; and receiving the requested first SI from the BS.

20. The processor of claim 19, wherein the preamble for requesting the first SI is transmitted to the BS, based on the first SI not being broadcast by the BS.

* * * * *